United States Patent [19]

Pitchford

[11] Patent Number: 4,860,233
[45] Date of Patent: Aug. 22, 1989

[54] DEDICATED FOOT/INCH CALCULATOR

[76] Inventor: Leonard J. Pitchford, 6300 Shadowwood Dr., Prospect, Ky. 40059

[21] Appl. No.: 790,035

[22] Filed: Oct. 22, 1985

[51] Int. Cl.$^4$ ................................. G06F 3/00
[52] U.S. Cl. ......................... 364/709.07; 364/709.11
[58] Field of Search ........... 364/709, 710, 761, 709.11, 364/709.12, 709.07, 706, 751, 710.1, 710.11

[56] References Cited

U.S. PATENT DOCUMENTS

| | | | |
|---|---|---|---|
| 3,654,449 | 4/1972 | Boyce | 235/156 |
| 3,739,161 | 6/1973 | Gross et al. | 235/156 |
| 3,809,872 | 5/1974 | Yamamura et al. | 235/170 |
| 3,976,867 | 8/1976 | Campbell | 235/169 |
| 4,048,484 | 4/1977 | Brittan | 235/156 |
| 4,081,859 | 3/1978 | Goldsaint et al. | 364/709 |
| 4,092,523 | 5/1978 | Tara et al. | 235/310 |
| 4,100,602 | 7/1978 | Shapiro | 364/715 |
| 4,100,603 | 7/1978 | Boyd | 364/771 |
| 4,134,536 | 1/1979 | Saito et al. | 235/310 |
| 4,144,568 | 3/1989 | Hiller et al. | 364/413.05 |
| 4,228,516 | 10/1980 | Johnson | 364/602 |
| 4,319,130 | 3/1982 | Spitzner | 235/310 |
| 4,367,535 | 1/1983 | Matsuyama | 364/736 |
| 4,370,728 | 1/1983 | Coffron | 364/900 |
| 4,458,325 | 7/1984 | Nakata et al. | 364/705 |
| 4,481,598 | 11/1984 | Ishiwata | 364/710 |
| 4,488,250 | 12/1984 | Lipsey et al. | 364/709 |
| 4,493,037 | 1/1985 | Takano et al. | 364/405 |
| 4,527,917 | 7/1985 | Ueno | 364/705 |
| 4,545,022 | 10/1985 | Hughins | 364/709 |
| 4,609,997 | 9/1986 | Matsugama | 364/709 |
| 4,623,979 | 11/1986 | Zatezalo et al. | 364/709 |
| 4,647,911 | 3/1987 | Maegawa et al. | 364/709 |
| 4,668,194 | 5/1987 | Narayanan | 364/709 |
| 4,688,020 | 8/1987 | Kuehneman | 340/365 R |
| 4,715,011 | 12/1987 | Brittan | 364/709 |

OTHER PUBLICATIONS uPD 7225 Intelligent Alpha Numeric LCD/Driver Technical Manual, Nippon Electric Company.

Primary Examiner—Gary V. Harkcom
Assistant Examiner—Dale M. Shaw
Attorney, Agent, or Firm—Middleton & Reutlinger

[57] ABSTRACT

A dedicated calculator for performing arithmetic operations on dimensioned quantities, particularly those in the English units of feet, inches and fractions of inches. The calculator keyboard includes a plurality of conventional algebraic calculator keys as well as dedicated keys for entry of values in inches and fractions of inches. A display provides formatting according to the mode of operation and the result. The calculator operates in modes for displaying feet, inches, and fractions of inches; decimal feet; metric values; and to operate as a conventional algebraic calculator. All numbers are stored internally as binary floating point numbers representative of values of feet. Therefore, all values are preserved when switching from metric mode to one of the foot modes and any conversions of the output to metric measurements are only made to the data to be displayed. A repeat function and a plurality of storage registers for storing both data values and operator values are provided so that repetitative operations may be easily executed. Also, the calculator responds to different keystroke sequences indicating division of a dimensioned quantity by a dimensioned quantity or an undimensioned quantity to provide an undimensioned, or a dimensioned displayed result. When the result is undimensioned, only the integer part is provided and a particular keystroke sequence may be used to selectively view the remainder as a dimensioned quantity.

1 Claim, 4 Drawing Sheets

DEDICATED FOOT/INCH CALCULATOR

TECHNICAL FIELD

The present invention relates to small dedicated calculators, and in particular discloses an improved calculator having dedicated keys for entry of data in foot and inches, and a plurality of display modes for displaying results of calculations in decimal feet, metric equivalents, or individual displays constituting feet, inches, and proper fractions of inches.

BACKGROUND OF THE INVENTION

It is well known that architects in the United States continue to use English systems of measurements in architectural drawings, despite the popularity of the metric system in other parts of the world and its ease of use. Consequently, most carpenters and builders executing the plans of architects also use the English system of measurements involving feet and inches. Traditionally, the resolutions of dimensions for architects, carpenters and others in the building trade have been expressed in proper fractions of inches with denominators which are integer powers of two.

Since inches to feet is a base twelve system, our normal numbering system is a base ten system, and the denominators of the proper fractions used are integer powers of two (which excludes ten and twelve as possibilities), simple arithmetic operations on the English system of measurements is somewhat cumbersome. It is not unlike trying to do arithmetic in Roman numerals.

When a reasonably large number of arithmetic calculations are required in the English system, people often convert each individual term of an expression to its decimal foot equivalent and reconvert the result to English measurements. When using hand-held calculators, such a conversion requires a relatively large number of keystrokes, and it is often difficult for the user to remember exactly what register or position in a stack in which the various values are stored.

To overcome this, dedicated calculators making provisions for entry of data representative of inch and feet quantities have been known in the past. The principal drawback of such devices is the absence of an ability to switch back and forth between operating modes without accumulated round-off error, an absence of functions and display modes particularly useful to the architect or builder. Other prior art calculators employ cumbersome direct accumulation of digits representing fractions, feet, and index, with somewhat exotic schemes for converting results of addition of integer values for numbers in various bases in order to convert from, for example, sixteenths of an inch to inches (base sixteen), and inches to feet (base twelve).

In the building trades, many materials are provided in sections having a standard length. Often the builder encounters a situation in which a number of pieces of a particular material of identical length are required for a job. Therefore, the builder needs to know how many such pieces can be obtained from a piece of the material supplied in the standard length. In essence, the user needs to know only the integer result of dividing the standard length by the unit length of the individual pieces to be cut. Once this is obtained, the total number of standard pieces needed for the job may quickly be derived.

In most of these situations, the user will have very little interest in the length of the remainder.

In other situations, the builder may need to divide a particular length expressed in feet, inches, and fractions of inches into an even number of equal segments. One example of such an application would be the building of a cabinet or shelf on the center third of a wall. Under these circumstances, the builder would need to divide the length of the wall, a quantity dimensioned in English units, by an undimensioned integer 3. The result is ⅓ of the length of the wall, and gives the user an indication of how far from each end of the wall the shelf should be placed, as well a figure for the length of the shelf.

It should be noted that in the first case, the information desired is the result of dividing one dimensioned quantity by another, giving an unsigned result indicating the number of the smaller pieces which may be cut from the standard piece. In the second example, the operation is the division of a dimensioned quantity by an undimensioned quantity to provide a dimensioned result.

It is also known in the art of designing dedicated calculators to provide calculators designed to be used in English units which will automatically convert an English unit quantity to a metric quantity, normally in meters. However, such calculators have normally replaced values for English units with metric values resulting from a multiplication. Repeated conversions, back and forth, of this type can lead to accumulated round off error.

Additionally, architects and practitioners of the building trades often encounter repeated occurrences of a particular dimension when working. For example, if one is attempting to calculate the total length of a portion of office space from a set of plans, the user will often encounter an object of a standard dimension, such as an eight inch wall. When moving along the plans and using a calculator, it can become cumbersome to continually have to execute key strokes corresponding to "plus eight inches". Under these circumstances, it is often desirable to be able to add dimensions of the other elements of the plan and then come back and do an appropriate operation for each wall.

Furthermore, in a number of plans, there will be several recurring dimension.

Prior art calculators have not provided a straightforward and convenient mechanism for easing use of a dedicated English unit calculator under these circumstances.

Additionally, dedicated English system calculators of the type which maintain separate integer values for feet, inches and fractions of a particular denominator, have not provided the ability to multiply decimal fractions of inches, which for example, are not equivalent to a proper fraction of sixteenths of inches, and to display the result with acceptable accuracy. Indeed, many such prior art calculators have a lowest resolution of a number which may be accepted by the calculator as the smallest proper fraction handled, such as 1/16th or 1/32nd of an inch.

Therefore, there is a need in the art of dedicated English unit calculators to provide a device which overcomes these shortcomings and has a great flexibility in the operations which may be performed without sacrificing accuracy. Additionally, it is desirable to provide a calculator which will display an undimensioned integer quantity in response to a keystroke sequence requesting the quotient of two quantities in English units and optionally to provide the user with a remainder expressed in English units. Furthermore, it is desirable to provide a calculator in which the user may also divide a dimensioned English unit quantity by a numerical value representing an undimensioned quantity and display a result in English measurements.

Similarly, the prior art has not provided an English unit calculator which provides simpler keystroke operations for recursive entry of an identical operation, particularly the addition of one or more repeatedly encountered quantities to an accumulated sum.

SUMMARY OF THE PRESENT INVENTION

The present invention overcomes these shortcomings of the prior art. Broadly stated, the present invention is an improved dedicated calculator having a keyboard and display specifically designed for performing calculations on quantities dimensioned in English units The present invention includes a keyboard with a plurality of conventional decimal digit keys which also serve for entry of quantities in feet. Additionally, the keyboard includes a plurality of keys specifically dedicated to entry of whole numbers of inches and another plurality of keys for entering proper fractions of inches. In the preferred embodiment, fifteen fractional keys for entry of fractional inches, in increments of 16ths of an inch, are provided.

The present invention also provides a novel and advantageous arrangement for displaying the results of calculations on English unit quantities. In particular, marks are provided to indicate which digits represent feet and which digits represent inches in the display. Furthermore, a dedicated segment of the display in the present invention displays any fractional quantities as a proper fraction wherein the numerator and denominator are divided by a slash. The preferred form of the present invention reduces all such displayed fractions to the lowest possible denominator and therefore only odd numbered digits are used as numerators.

According to another aspect of the present invention, a dedicated repeat key is provided so that the most recently entered operation, including the data used in the operation, will be repeated. In the example cited above for adding a particular dimension for a plurality of walls, once the other units have been accumulated, a first entry of "+" followed by the thickness of the wall in English units may be made. From this point forward, the repeat key may be pressed a number of times corresponding to the number of walls encountered in order to add these to the total. This allows the user to easily proceed along, for example, a set of plans hitting the repeat key each time they move their finger from one wall on a plan to the next.

The preferred form of the present invention also provides a dedicated segment of its display to display the number of times the repeat key has been operated so that the user will not lose track of the number of times the recursive entry has been made or will be able to tell if some form of contact bounce has caused an entry to be repeated an inappropriate number of times.

Additionally, the present invention includes additional storage registers which store both a data value and an operator value so that more than one recurring quantity, plus its operation to the value in the calculator's accumulator (for example, adding or subtracting the quantity), may be repeated while the calculator is in use.

The preferred form of the present invention furthermore provides dedicated segments of the display to indicate the particular mode of operation in which the calculator is currently being operated.

Another advantageous feature of the present invention is the way in which it treats divisional operations when in a mode of operation providing output in English units, that is, feet, inches, and fractions of inches. Once a dividend is entered, followed by the operation of the division arithmetic key (÷). The calculator will respond to provide different information in the display depending on the subsequent keystrokes associated with the divisor.

If the divisor is entered as an English unit quantity, the display simply displays the integer value of the division. If a remainder is present in these circumstances, a predetermined segment of the display, a plus segment in the preferred embodiment, flashes to indicate the remainder is present. The user may view the remainder simply by pressing the equal key a second time, or may go on to other operations.

If the divisor is an unsigned quantity, indicated by the inclusion of a decimal point in the keystroke sequence. The displayed result is simply provided in English units. This corresponds to dividing English unit quantities in the second example recited above in the background of the invention.

Accordingly, it is an object of the present invention to provide an improved dedicated English units calculator.

It is a further object of the present invention to provide an English units calculator which will display the output of results calculated in English units in feet, inches and proper fractions of inches.

It is a further object of the present invention to provide an improved English units calculator which allows the user to selectively switch between display of quantities stored in the calculator as feet, inches, and fractions of inches and decimal feet, or feet in decimal fraction of feet.

It is a further object of the present invention to provide an improved multimode calculator, one of which is dedicated to computation in English units which has dedicated keys for entering inches and fractions of inches which are disabled when the calculator is in a non-English units mode.

It is a further object of the present invention to provide an English units calculator which has a display of results of division operations which distinguishes between a divisor which is a linear dimensioned quantity and a divisor which is an undimensioned quantity and which provides, respectively, an undimensioned integer result with an option of viewing a dimensioned remainder in response to the first type of division, and provides a dimensioned result in response to the second type of division.

It is a further object of the present invention to provide a dedicated linear dimensional calculator which is selectively switchable between modes in which input and output quantities represent feet and inches, and in which input and output quantities represent metric measurements, which does all of its internal arithmetic in terms of one measurement system or the other, and adjusts the displayed output values accordingly.

It is a further object of the present invention to provide an improved English units calculator which executes all of its internal computations in binary floating point mathematics and rounds a result for display, according to a chosen display format.

That the present invention overcomes the above-cited drawbacks of the prior art and achieves the objects of the present invention recited above, it will be appreciated from the detailed description below.

DETAILED DESCRIPTION

Figure 1:
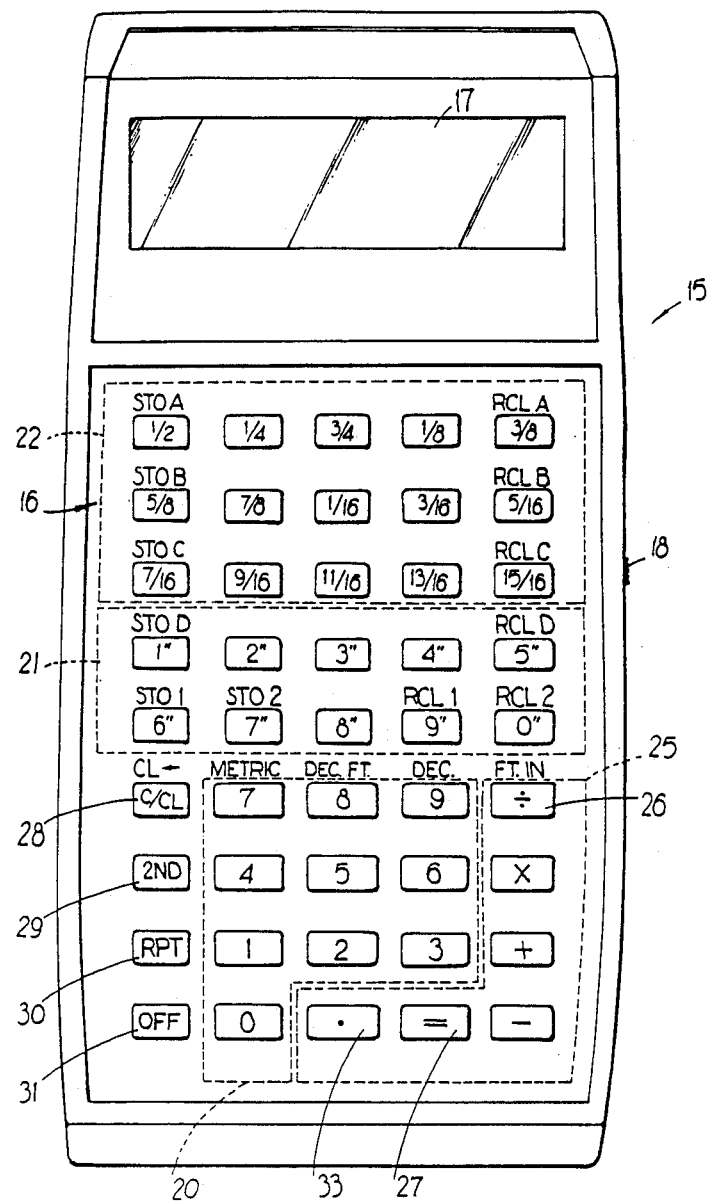
FIG. 1 is a pictorial view of the preferred embodiment of the present invention.

Turning now to the drawing figures in which like numerals represent like parts, the preferred embodiment will now be described. FIG. 1 is a pictorial view of the calculator 15 of the preferred embodiment. The calculator has a 45-key keyboard 16 with the keys arranged in a nine by five array. At the top of the calculator is a 122-segment liquid crystal display 17. On the side of the calculator a 5-pin printer port 18 is provided so that an optional accessory printer may be used with the calculator to provide a paper tape record of the results of its use.

In FIG. 1, each of the keys bears an indicia corresponding to its significance to the calculator. As is shown in the drawing, the keyboard 16 includes a first plurality of keys 20 representative of decimal digits 0 through 9. The keyboard also includes a second plurality of keys 21 representative of inch values in base ten digits. A third plurality of keys 22 represents fractional inch values in proper fractions having denominators which are integer powers of two. This corresponds to the standard fractional inches used by architects and carpenters in the United States. As may be seen from FIG. 1, the preferred embodiment uses fractional inch entries with the resolution of 1/16th inch.

A fourth plurality of keys 25 are provided which are representative of the four standard arithmetic functions of addition, subtraction, multiplication and division. Response of the calculator to the operations using divide key 26 are discussed in greater detail hereinbelow. Among plurality 25 is equal key 27. This indicates to one skilled in the art that the preferred embodiment employs conventional algebraic notation for the calculator entries. However, other notational formats, including reverse Polish notation, could be used in calculators embodying the present invention.

Additional keys 28 through 31 also appear on keyboard 16. Key 28 is a conventional clear key which may be operated once to clear the last entry from the calculator and twice to clear the registers of the calculator. A key 29 labeled "2nd" operates as a shift key to invoke the functions which appear written over some of the other keys, which will be described in detail hereinbelow. A repeat key (RPT) 30 is used to implement one novel aspect of the present invention briefly described above, and described in greater detail hereinbelow. Off key 31 turns the calculator off, as it appears to the user. Actually, as described hereinbelow, the processor of the calculator is placed in a low power mode and the display is turned off.

Figure 2:
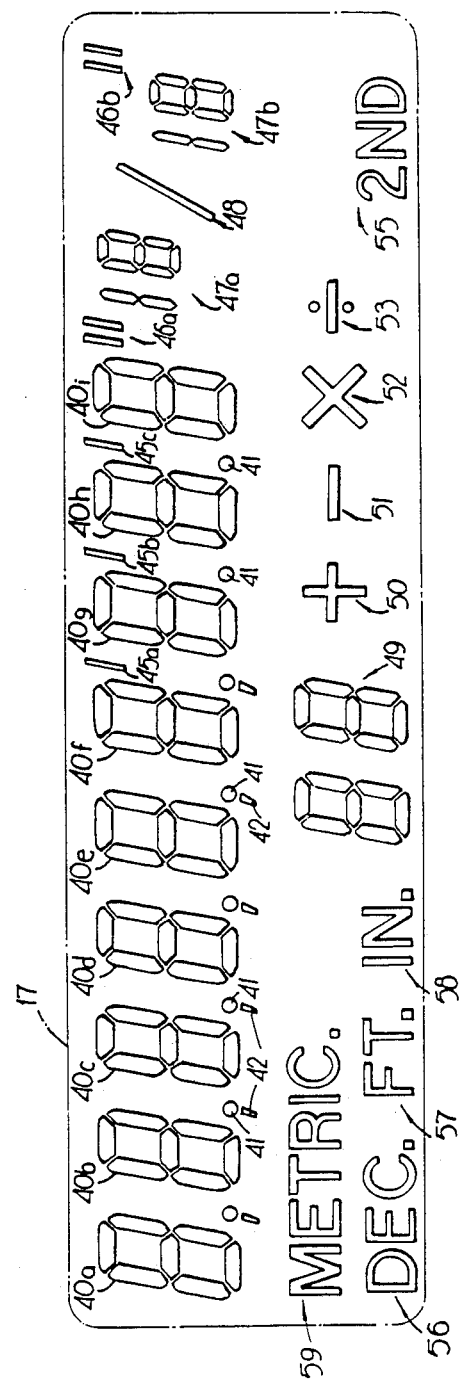
FIG. 2 is a plan view of the display segments of the preferred embodiment of the present invention.

Turning next to FIG. 2, the display 17 of the preferred embodiment is shown. Display 17 of the preferred embodiment is a 122-segment liquid crystal display device. The main portion of the display is comprised of nine 7-segment sectors 40a-40i which are used to display digits for integer and decimal results. Eight decimal point segments are provided, a typical one of which is indicated as 41 in FIG. 2. These may be used in a conventional manner to place a decimal point within a decimal result. Additionally, each of 7-segment sections 40a-40f is followed by a comma segment, a representative one of which is shown as 42 in the drawing. These are used to provide the traditional commas between each three digits of an integer result in excess of 999 to improve readability of the display.

Also provided are a plurality of foot indicia indicator segments 45a-45c. These are selectively activated behind a display of an integer number when the calculator is in the foot/inch mode and behind an entire result when the calculator is in the decimal/foot mode. Two inch indicia indicator segments are provided as 46a and 46b. Inch indicia indicator 46a is activated when an integer number of inches is displayed in the result which the calculators in the foot/inch mode, and indicia 46b is activated when a fractional result is displayed. A combination of a 7-segment sector and a selectively actuable segment for providing the digit 1 is included at 47a and 47b for displaying the numerator and denominator, respectively, of any fractional inch results in the foot/inch mode. Slash segment 48 is activated when such a fractional result is displayed. The display also includes two 7-segment sections associated with each other which are shown as 49 in the drawing figure. These segments, as described hereinbelow, are activated when the repeat key is used.

Segments 50–53 are activated when a particular one of arithmetic function keys 25 (FIG. 1) are activated. An additional segment 55 displays an indication of 2ND when key 29 (FIG. 1) is activated to provide a shifted input function. Additionally, segments 56–59 are activated to provide indications of "DEC.", "FT.", "IN." and "METRIC.", respectively to display the mode in which the calculator is operation.

Before proceeding to FIGS. 3 and 4, the modes of operation of the calculator and typical output displays in response to operation of the keys at keyboard 16, will now be described. The calculator of the preferred embodiment operates in four separate modes. The first mode is referred to herein as the foot/inch mode and is, in many respects, the primary focus of the present invention. In this mode, all keys on keyboard 16 are active and data is entered as follows. Foot values are entered by operation of one or more of keys 20. Integer inches are entered by operation of one of keys 21 with two operations of the one inch key to enter eleven inches.

Fractional inches resolved to 1/16th of an inch are entered by operation of keys 22. It should be noted that keys 22 are arranged, proceeding across the rows from rows 1-3 so that the ½ inch key is first encountered followed by proper fractions having a denominator 4, followed by proper fractions having denominator 8, and lastly by proper fractions having the denominator 16. In each of these subsets, the numerators proceed, as one moves across the rows from left to right, in ascending order. It has been found by the inventor of the present invention that this keyboard layout allows users of the present invention to quickly adapt to the entry of fractional inch data since they learn where on keyboard 16 keys having particular denominators are clustered, rather than having to mentally determine that, for example, one quarter inch lies between 3/16ths and 5/16ths. Of course, other arrangements are possible but the one shown in FIG. 1 is preferred.

In the foot/inch mode, segments 57 and 58 are both illuminated to indicate to the user that a calculator is operating in the foot/inch mode. Values are displayed in a format which may be described as "FEET'-INTEGER INCHES FRACTIONAL INCHES"". From this is will be appreciated that, as described above, inch indicia indicator 46b is activated whenever fractional inches are displayed in display 17. When the result entered or displayed in display 17 lacks a fractional inch value, the format becomes FEET-INTEGER INCHES"" and inch indicator 46a is activated in these circumstances. The middle horizontal segment of 7-segment sections 40g or 40h is used to provide the dash indicated in the format above between the value for feet and the value for inches.

Also, as noted above, if the feet in any given entry or result exceed 999, one of the comma segments, an exemplary one of which is shown as 42, is activated to divide sets of three digits to improve readability.

It is the belief of the inventor of the present invention that adoption of this display format provides a readability of a display when the calculator is in the foot/inch mode which is superior to that of prior art English unit calculators.

A second mode of operation of the calculator is decimal feet. The calculator is selectively placed in this mode by operation of second key 29 followed by the decimal eight key which bears the notation "DEC.FT." above it. Thus, 2ND key 29 is a dedicated shift key and the sequential operation of key 29 followed by the "8" key provides mode control signals to the processor used in the preferred embodiment to place it in the decimal foot mode.

In the decimal foot mode, entries and results are displayed as decimal digits representing integer feet and 10ths, 100ths and 1000ths of feet. In the preferred embodiment, the maximum number of decimal places displayed in the decimal foot mode is three. Therefore, one of foot indicia indicator segments 45a–45c is activated after the numeric display of the result or entry. In the decimal foot mode, key arrays 21 and 22 are inactive and all entries are made via decimal keys 20.

A third mode of operation of the calculator is the metric mode. A mode control signal is provided to the processor used in the preferred embodiment by operation of 2ND or shift key 29 followed by operation of the 7 key. Naturally, in this mode, segment 59 of display 17 is activated to tell the user the calculator is in the metric mode. In the metric mode of the preferred embodiment, the displayed results indicate meters. The results are displayed as typical decimal digits and there is no limit, other than the limit on the number of 7-segment sections, to the number of decimal places displayed. Naturally, in the metric mode, activation of display segments 45–47 are suppressed.

Lastly, the calculator also includes a conventional algebraic calculator mode in which display sections 40a–40i, together with the comma and decimal points segments are used to simply indicate conventional algebraic results. In this mode, segment 56 is illuminated to indicate the user the mode of operation.

At this point, it is appropriate to discuss an advantageous feature of the present invention as it relates to switching between modes. The present invention employs a microprocessor which is described in connection with FIG. 3. Unlike some prior art English unit calculators which maintain separate register values for feet, inches and fractional inches of a predetermined denominator, the preferred embodiment when in any of its modes 1-3 described above, executes all internal calculations by the use of binary floating point arithmetic. Furthermore, it should be understood that in modes 1-3, which may also referred to as the dimensioned modes, the internal floating point values maintained by the calculator are always representative of feet.

As is explained in greater detail in connection with FIG. 3, a segment of random access memory used in the preferred embodiment is always devoted to values to be displayed in display 17. However, internal arithmetic is maintained in a number representing feet. Therefore, in either the foot/inch mode or the decimal foot mode, the values entered from keyboard 16 are converted directly into binary floating point representations of the value and the appropriate operation specified by selective operation of algebraic keys 25 is performed, with results being retained in floating point binary representation of number of feet.

When the calculator is in the metric mode, values entered from keyboard 16 are first converted from meters to feet using floating point arithmetic and are stored internally, and operated on internally as numbers of feet. When in the metric mode, a routine executed by the processor used in the preferred embodiment converts the result to be displayed back to a metric value which in turn is displayed in display 17.

It should be apparent from the foregoing description that this architecture gives the preferred embodiment of the present invention an advantage over prior art dedicated measurement calculators Since the internal floating point values used by the preferred embodiment are always representative of foot values, the user may readily shift back and forth between the metric mode and either the foot/inch mode or the decimal foot mode without any loss of accuracy or loss of data. When a plurality of values are stored in registers a–d, described hereinbelow, and the user switches from one of the foot modes to the metric mode, the values in these registers remain unchanged and the user is simply provided with the metric equivalent of these values to operate with. Furthermore, there is no accumulated round-off error for multiple conversions in switching back and forth from the metric mode to either the decimal foot mode or the foot/inch mode.

As noted hereinabove, one of the objects of the present invention is to provide an arrangement whereby repetitive operations often encountered in dimensioned calculations by architects or builders are simplified. In connection with this, it should be understood that a portion of the random access memory of the preferred embodiment is devoted to five storage registers. Four of these registers are referred to as registers a–d in the preferred embodiment and a fifth register represents the most recently performed operation. The important aspect of these registers is that each of them stores not only a numeric value, but a digital number representing the operation performed. Therefore, if the most recent operation was, for example, operation of +7", operation of repeat key 30 will cause 7" to be added to the accumulated result displayed in display 17. Therefore, when a repetitive number of entries are required, operation of the dedicated repeat key 30 repeats the operation of not only providing the last provided data entered from keyboard 16 but also the arithmetic operator executed in the last operation.

When the repeat key is used, the dual 7-segment section 49 of display 17 is activated to indicate the number of times the repeat key has been successively operated. Therefore, as pointed out in the previous example, if an architect is adding repetitive values for wall thicknesses as he or she proceeds down a plan, display section 49 will indicate the number of times the repeat key has been operated so that the user may confirm that an appropriate number of entries has been made.

The four registers a–d operate in the same manner as the most recent entry register does in response to repeat key 30, except that separate keystroke sequences must be executed to store values in these registers and to recall same. As may be seen from inspection of FIG. 1, storage of values both for data and an arithmetic operator in registers a–d are accomplished by shifting the function of the four separate keys on the upper left-hand portion of keyboard 16. Similarly, recall of these values and operators is accomplished by shifted operation of four keys in the upper right-hand column of the keyboard. The shifted operation of the keys again refers to operation of 2ND key 29 prior to operation of the particular key for storing or recalling the values.

Thus, for example, if subtraction of a particular value is going to be used at a later time during a sequence of calculations, once that value has been entered and subtracted, the user would sequentially operate second key 29 followed by the ½ inch key. (Shifted to "STOA".) When this identical value is to be subtracted again, at a later time, these operate 2ND key 29 followed by the ⅜ths inch key which is shifted to "RCL A".

The novel and advantageous response of the preferred embodiment to division of a dimensioned quantity by either another dimensioned quantity or an undimensioned quantity will be discussed in detail in connection with FIG. 4.

Figure 3:
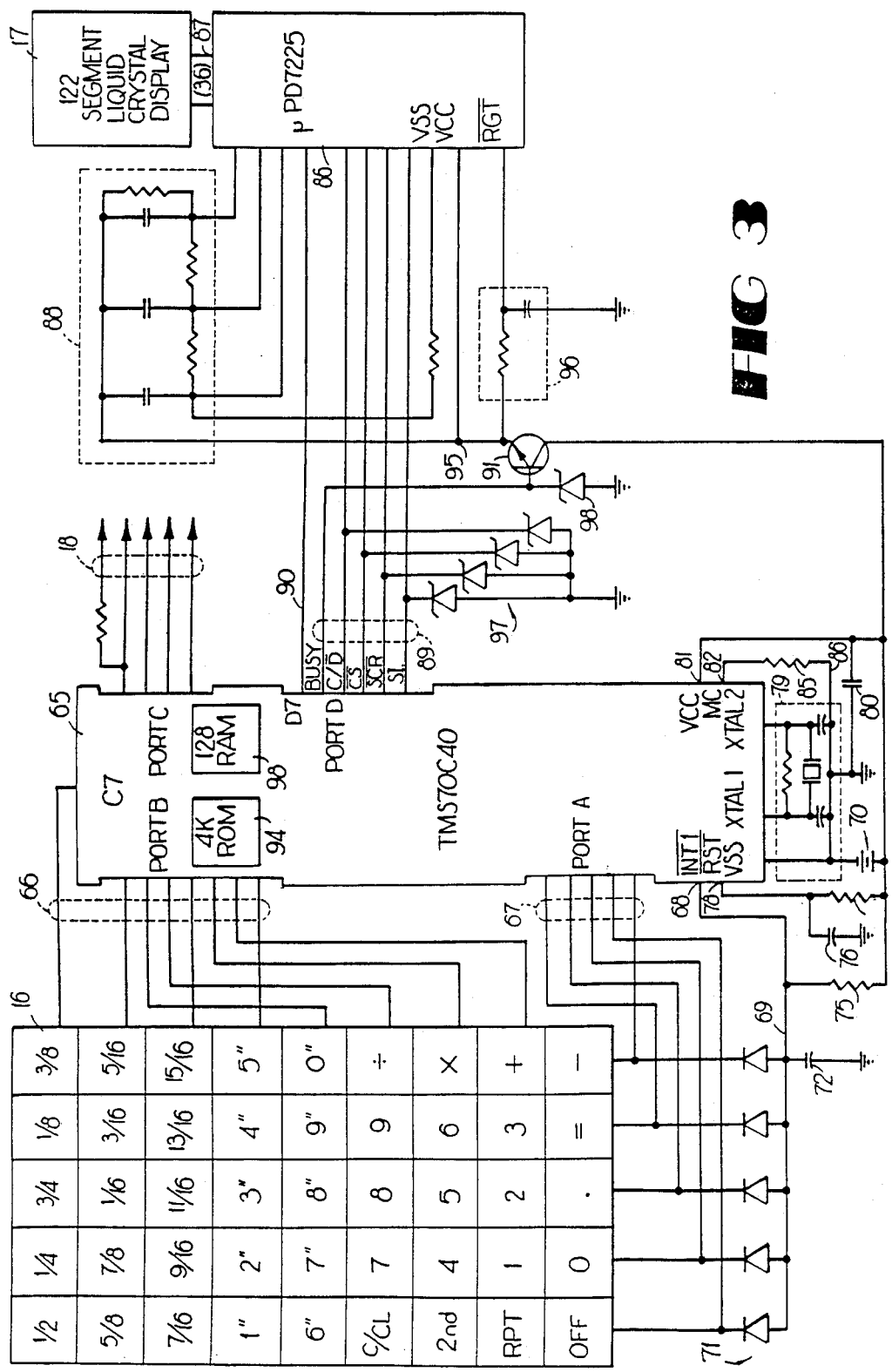
FIG. 3 is a schematic diagram of the preferred embodiment of the present invention.

Turning next to FIG. 3, a schematic diagram of the preferred embodiment is shown. A preferred embodiment of the present invention is constructed around a microprocessor 65. In the preferred embodiment, processor 65 is implemented by a TMS 70C40 type CMOS one chip microcomputer currently manufactured by Texas Instructions Corporation of Dallas, Tex. While some references are made to the operation of this device in this specification, it will be familiar to those skilled in the art, and detailed descriptions of its internal structure and operations are provided in a publication entitled "TMS 7000 Family Data Manual, 8-bit Microcomputer Family", published by Texas Instruments Incorporated in 1983. Said manual is hereby incorporated by reference exactly as if set forth in full herein.

Keyboard 16 is interfaced to processor 65 via 9-row lines 66 and 5-column lines 67. As is known to those skilled in the art, the 70C40 type processor is provided with port A as a tristate general purpose input port and port B is configured in the preferred embodiment to be a general purpose output port. The electrical configuration of keyboard 16 is a typical cross point array in which activation of one of the keys closes a contact between a row line and a column line. Additionally, one of lines 66 is connected to pin C7 of the general purpose input/output port C of processor 65.

Processor 65 responds to inputs from keyboard 16 via a low-going signal on negated interrupt input 68. Input 68 is connected to line 69 which is normally held at the positive power supply voltage provided by a battery 70. When awaiting a keyboard input, all logical zero values are written to port B and to pin C7. When one of the keys is depressed, a path is completed between line 69 and one of lines 66 through one of a plurality of blocking diodes 71. This pulls line 69 low as capacitor 72 rapidly discharges. Taking line 69 low provides a negative-going strobe to interrupt input 68 and the processor operation is interrupted to go to a conventional keyboard input routine to determine the particular key pressed.

In the preferred embodiment, the lines of port B and line C7 are sequentially taken to a logic zero level while the processor reads the five lines 67 connected to port A. The particular line of port A which carries a logical zero condition when a particular one of lines 66 carries a logical zero output value will determine the row and column of the key depressed.

A resistor 75 controls a time constant for recharging capacitor 72. A conventional RC network consisting of capacitor 76 and resistor 77 holds reset input 78 low during insertion of a new battery 70 in a manner which will be known to those skilled in the art. Also, a ceramic resonator circuit 79 of the type described in the above-referenced TMS 7000 Family Data Manual is used to provide a master clock signal for processor 65. A filter capacitor 80 is used to decouple resonator circuit 79 from the positive power supply appearing on line 81. A mode control input 82 is held low through resistor 85 and line 86 to control the mode of operation of processor 65.

Liquid crystal display 17 is controlled by a uPD7225 intelligent alpha/numeric LCD controller and driver 86. This device is currently manufactured by Nippon Electric Company (NEC) and operation of the device is described in detail in a document entitled "uPD7225 Intelligent Alpha Numeric LCD/Driver Technical Manual" published by NEC. Said technical manual is hereby incorporated by reference exactly as if set forth herein.

Display 17 is interfaced to controller driver 86 via a collection of thirty-six lines shown as 87 in FIG. 3. These lines control the voltages for the various segments described above in the back plane in order to effect the display described in connection with FIG. 2. A biasing ladder network 88 is connected to controller driver 86 in a manner described in the above-referenced technical manual, which will be known to those skilled in the art. Driver 86 is connected to processor 65 through five lines 89 and control line 90, all of which are connected to bi-directional I/0 port D of processor 65. Five lines 89 are each labeled with the function of the pin of controller 86 to which they are connected, as specified in the above-referenced NEC technical manual.

Line 90 is connected to the base of a transistor 91 which is used to turn display 17 and display driver controller 86 on and off under the control of processor 65. Transistor 91 operates as a switch between the positive supply voltage from battery 70 on line 92 and point 95 which is provided to the positive supply pin of controller 86 and used as RC network 96 to provide a conventional reset function to controller 86 upon power up. A plurality of zener diodes 97 and 98 limit the input voltage to input lines of controller 86 and transistor 91.

Internal memories of processors 65 are represented by blocks 94 and 98 which, respectively, indicate that processor 65 has four kilobytes of internal read only memory (ROM) and 128 bytes of random access memory (RAM). It should be understood in the preferred embodiment that RAM 9 8 is partitioned into a plurality of segments for holding intermediate results of calculations, the data and operational signals for embodying storage registers a-d and the last entry register as described above, and a portion of the RAM for storing display output signals. Therefore, a first portion of RAM 98 stores a plurality of floating point numeric values representing length values entered from keyboard 16 and calculated by processor 65. A second display portion of RAM 98 is used to store signals for display which represent values entered from the keyboard and calculated by the processor.

In the preferred embodiment, processor 65 calculates results, and furthermore calculates a value (which will be either zero or one) for each of the 122 segments of liquid crystal display 17. Therefore, sixteen 8-bit bytes of RAM 98 are required as the second display memory portion of RAM 98. It should be understood that while the array of signals stored in these sixteen bytes simply indicate whether particular segments of display 17 should be active or inactive, these stored signals do represent values entered from keyboard 16 or calculated by processor 65.

While the calculator is active, the control instructions resident in ROM 94 periodically provide information from port D to controller 86 about the proper current state of the display. In a manner described in the above-referenced technical manual for the PD7225 controller, data is provided in a serial format from port D to controller 86 in a manner which will be familiar to those skilled in the art. Of course, other arrangements can be used to construct embodiments of the present invention, but it is believed advantageous to use an intelligent LCD controller driver similar to the type PD7225 which requires only serial data output from processor 65, in view of the complexity of display 17 of the preferred embodiment.

Additionally, a 5-line printer interface is provided on lines 18 from bi-directional I/0 port C of the type 70C40 processor. One of lines 18 is used as an input line to receive a printer busy signal from a conventional printer interface. The remaining lines provide serial data, a clock signal for shifting, and a clear signal to a conventional 8-bit shift register used as a serial to parallel converter for providing output data to a printer which may optionally be connected to the preferred embodiment.

Lastly, one preferred aspect of the preferred embodiment should be noted. The type 70C40 is a CMOS microprocessor and thus consumes relatively little power. The device includes a low power mode which it can enter under software control. When the calculator is either turned off through the operation of off key 31 (FIG. 1), or is not operated for a sufficiently long period of time, control instructions in ROM 97 instruct the processor to enter its low power mode.

Under these conditions, certain internal operations of the processor are suspended and pin D7 connected to line 90 is taken low in order to turn off display 17 and controller 86. In this state, only a very small current is drawn from battery 70. Processor 65 will still respond to an interrupt at input 68 in order to "wake up" and become fully functional if one of the keys of keyboard 16 is depressed.

The programming of processors such as microprocessor 16 in order to implement the functions described hereinabove will be known to those skilled in the art. In particular, much of the inventive insight which led to the present invention was the inventor's understanding of how a calculator should appropriately respond to various operations on English unit measurements in order to provide the most useful display of outputs to the user. Therefore, intimate detail of implementation of the functions described hereinabove need not be included since execution of these is a matter of software engineering within the ordinary level of skill in the art.

However, the fundamental logic of the response of the preferred embodiment to the division operations described in the summary of the invention will now be described in connection with FIG. 4. It will be understood by those skilled in the art that FIG. 4 is not intended to represent a detailed machine language instruction level flow chart but to indicate the basic logic used in order to implement the particularly useful novel response to division operations by dimensioned or undimensioned quantities.

Figure 4:
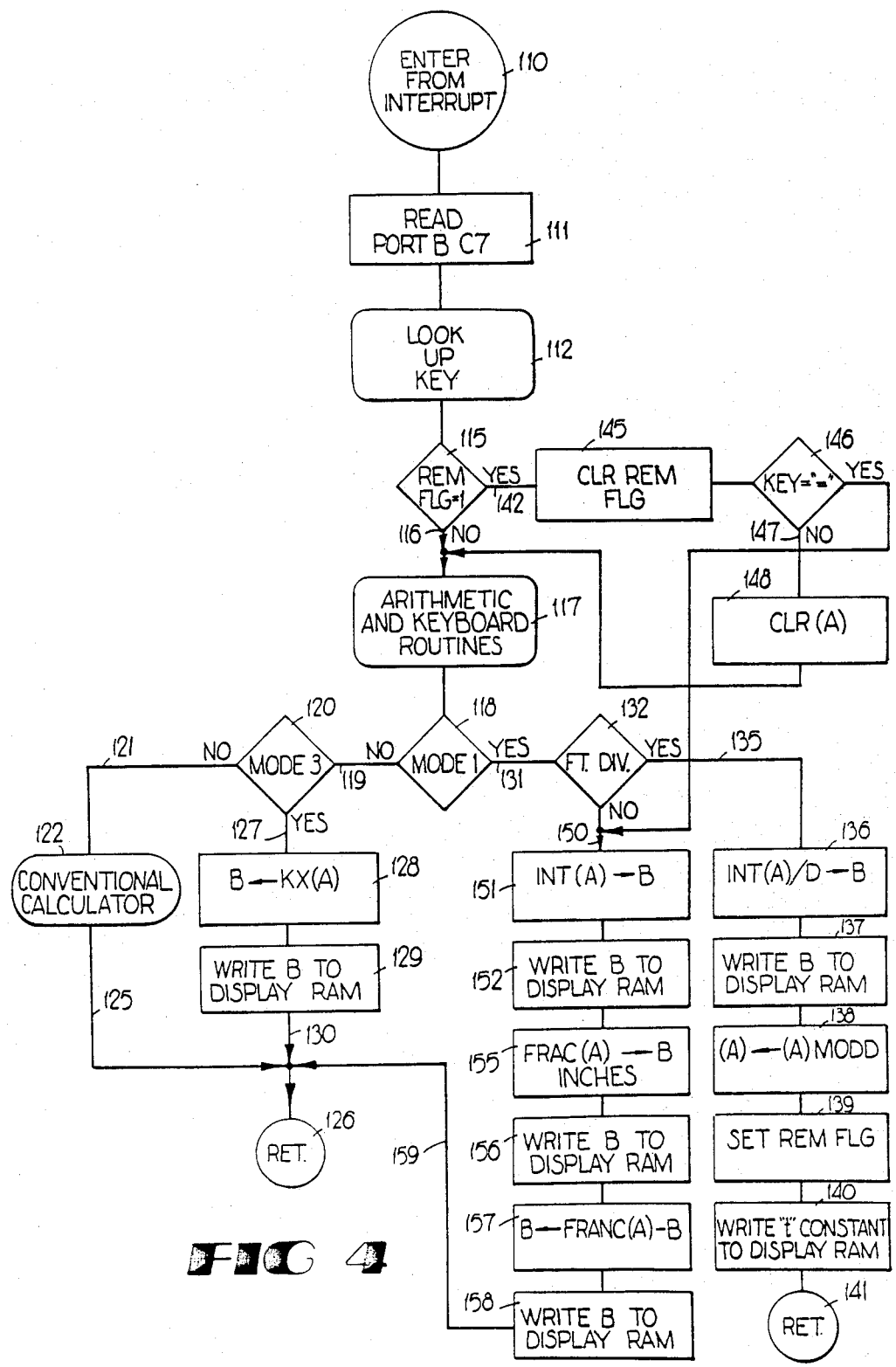
FIG. 4 is a flow diagram of logic representing the response of the calculator to the two types of division referred to above.

Therefore, turning to FIG. 4, the appropriate entry point is step 110 labeled enter from interrupt. This represents entry to a routine from a keyboard interrupt described hereinabove. The routines represented by step 111 are simply reading of the keyboard input lines 66 and 67 described hereinabove. Once the particular combination of a line of port B (or line C7) and a line from port A has been determined, the value or operation associated with this key is looked up in a look-up table at step 112. At step 115, a remainder flag value is tested to determine if it is set or cleared. The significance of the remainder flag will be described hereinbelow. Assume for the moment that the remainder flag is not set, and therefore branch 116 is taken from step 115.

This leads to conventional routines, shown as 117, for providing a floating point value for the keyboard entry or execution of an arithmetic operation in response to keyboard entries. As noted hereinabove, all dimensioned entries, that is all entries of data made when in any mode other than the conventional algebraic calculator mode, are first converted to binary floating point numbers representing feet. In the conventional algebraic calculator mode, the binary floating point numbers simply represent undimensioned quantities and may only be entered through conventional key arrays 20 and 25.

Next, the control instructions in ROM 97 cause processor 65 (FIG. 3) to test whether the calculator is in its foot/inch mode (mode 1) at step 118. To discuss conventional matters first, assume that the calculator is not in its foot/inch mode, therefore NO branch 119 is taken from step 118. Next, a determination of whether the calculator is in the metric mode is made at step 120. If it is not, branch 121 is taken which will either be the decimal mode or the conventional algebraic calculator mode, all of which is simply indicated by routines 122. In these routines, appropriate data is written into the second display portion of RAM 98 in a manner which will be apparent to those skilled in the art. Once this is accomplished, branch 125 is taken to return point 126.

If it is determined that the calculator is in the metric mode (mode 3) at step 120, YES branch 127 is taken to step 128. In FIG. 4, the notation "A" represents a current value in the processor accumulator. This should be thought of as the value to be displayed in display 17. At step 128, this value shown is multiplied by a constant K which corresponds to conversion of the foot value in the accumulator to a metric value.

Next, step 129 is executed which is labeled "write B to display RAM". It should be understood that writing a variable B to a display RAM as used in connection with FIG. 4 also includes the steps of converting the appropriate value to be displayed into a bit pattern appropriate for display in the various segments of liquid crystal display 17. When this has been accomplished, return step 126 is reached via branch 130.

Next, the novel function of the present invention in response to dimensioned and undimensioned division will be described. Assume that the calculator is in fact in the foot/inch mode and therefore that YES branch 131 will be taken from step 118. This leads to decisional step 132 labeled FT DIV which tests whether division by a dimensioned quantity of feet or an undimensioned quantity was made. Of course, if a sequence of key strokes had been, made which indicated an operation other than division, other routines which are not shown on FIG. 4 would be entered and executed. Therefore, it should be assumed that step 132 that division operation has been detected.

YES branch 135 is taken from step 132 if processor 65 determines that the divisor used in a division operation is a dimensioned quantity, that is, if it included an entry of values representing feet, inches and/or fraction of inches. The instructions in ROM 97 cause processor 65 to assume this is the case whenever the calculator is in its foot/inch mode and conventional foot/inch data is entered for the divisor, as described hereinabove.

It should be recalled from the discussion in the background of the invention that this corresponds to division of a dimensioned quantity by a dimensioned quantity to, for example, determine how many pieces of material of a particular length may be cut from a standard length of such material. In this case, the desired output is to give the user an integer value answering this question, with an option of reviewing the remainder. Viewing of the remainder may be useful, for example, if other lengths of such standard material are required for other components of the building project so that the user may determine if the left over pieces from the contemplated cuts may be used elsewhere, or will simply be scrap.

From branch 135, the first step executed is 136. The notation on step 136 indicates that the integer part of the quotient of the value in the accumulator (which will be the dividend) divided by the value of the last entered dimensioned divisor, which is indicated as D, should be transferred to a variable indicated as B. Therefore, upon execution of step 136, the variable B contains only the integer part of the quotient. At step 137, this value for B is converted into appropriate display signals for storage in the display portion of RAM 98.

The user sees the result as an integer displayed in sections 40a–40i of display 17 (FIG. 2) with all of foot and inch indicia 45 and 46 suppressed. Note that only the integer value, which is normally the answer of interest to the user, is provided in response to this operation.

Subsequently, step 138 is executed in which the value in the accumulator (the dividend) is operated on by modulo D arithmetic (D being the divisor) and the result is placed in the accumulator (A). Since the accumulator now holds the result of the dividend operated on by modulo D arithmetic where D is the divisor, the accumulator value represents the remainder of the operation of dividing one dimensioned quantity by another.

After this, the remainder flag is set at step 139. Once this is accomplished, a routine is entered at step 140 which is used to alert the user that a remainder value may be viewed if desired. Appropriate values are written to the display RAM to cause plus segment 50 to be intermittently activated and thus appear to flash to the user. This is accomplished by processor 65 by periodically changing the value of the bit provided to controller 86 representing the state of segment 50. Therefore, plus segment 50 provides a distinctive flashing display segment under these circumstances. Once this is accomplished, the program returns from the interrupt routine at step 141.

The preferred embodiment is designed so that if the user desires to review the remainder stored in the accumulator, the equal key 27 is pressed. This corresponds to two successive operations of equal key 27 (FIG. 1) because it must be operated previously to obtain the results of the division in an algebraic notation calculator.

Assume for the moment that the user wishes to view the remainder. The routine is entered at step 110 and arrives at step 115 at which the remainder flag is tested. Under these circumstances, this test will be positive and YES branch 142 is taken from step 115. The remainder flag is cleared at step 145 and at step 146 a test is made to determine whether the equal key has been operated. If a key other than the equal key is operated, NO branch 147 is taken, the accumulator is cleared at step 148, and appropriate routines 177 are executed to start a new operation.

If the equal key is in fact the next key depressed, YES branch 145 is taken from step 146. Branch 149 leads to branch 150 which is also the branch taken from step 132 when a division operation was operated using an undimensioned divisor. Thus, it should be appreciated that the steps between branches 150 and 159 represent the normal operation of providing display signals representative of feet, inch and fractional inch quantities to the display portion of RAM 98.

In the preferred embodiment, division by an undimensioned quantity when the calculator is in the foot/inch mode (mode 1) is indicated by operation of decimal point key 33 (FIG. 1). Note that this is accomplished by using the decimal point key when providing a decimal notation divisor, or using it as the last key stroke in providing an integer divisor, prior to operation of equal key 27. The use of the decimal key in connection with a divisor while the calculator is in the foot/inch mode indicates to the calculator that the divisor is to be considered an undimensioned quantity, and therefore that the quotient should be displayed as a dimensioned quantity.

Therefore, it is assumed at step 151 that the results of the floating point division are present in accumulator (A). At step 151, the integer portion of the value in the accumulator is written to a variable B. At step 152, appropriate display signals corresponding to the value of variable B are written into the display RAM.

At step 155, the fractional portion of the value in the accumulator is assigned to variable B. Note that the fractional portion of the accumulator value can represent whole number of inches since the accumulator value is a floating point number representing feet. Therefore, step 156 represents the determination of the whole number of inches represented by the variable B. At step 157, this portion of the floating point number is subtracted from B to provide a remaining value which represents fractional inches. When a number of inches greater than 15/16 are present, appropriate data is written to activate either sections 40h or 40i (FIG. 2) of display 17. Also, if a non-zero fractional inch remainder is present, appropriate signals for activating sections 47a and 47b and segment 48 are also written to the display RAM. At step 158, these are written to the display RAM.

It should be noted from the foregoing that it would be appropriate to execute all of the arithmetic steps 151, 155 and 157, and to subsequently write signals representative of the entire result to display RAM.

Since the steps between branches 150 and 159 are entered when either a remainder is displayed, or a division a dimensioned quantity by an undimensioned quantity is executed, it will be apparent that the displayed value will indeed include feet, inches, and fractional inches (where they are present) and that appropriate ones of segments 45 and 46 will be activated to indicate the dimensions of these quantities.

From the foregoing it will be appreciated that the present invention indeed accomplishes the objects set forth above and overcomes the above-cited drawbacks of the prior art. In view of the foregoing disclosure, other embodiments of the present invention will suggest themselves to those skilled in the art and therefore the scope of the present invention is to be limited only by the claims below.

I claim:

1. A calculator for operating on linear measurements, including values directly entered representative of foot and inch dimensions comprising in combination:
    a keyboard including a first plurality of keys representative of the decimal digits 0 through 9, a second plurality of keys representative of inches in base 10 digits, a third plurality of keys representative of a plurality of fractional inch values having denominators which are integer powers of 2, a fourth plurality of keys representative of arithmetic functions, a dedicated repeat key, and at least one shift key for providing mode control signals in response to selective operation of at least one of said keys;
    a processor for controlling operation of said calculator in response to selective operation of said keys and a plurality of stored instruction signals;
    read only memory means connected to said processor for storing said plurality of stored instruction signals;
    random access memory means associated with said processor including a first memory portion for storing a plurality of floating point numeric value representative of length values entered from said keyboard and calculated by said processor, and a second memory portion for storing display signals for display representing said values entered from said keyboard and calculated by said processor;
    a display connected to said processor including a plurality of digit segments, at least one foot indicia indicator segment, at least one inch indicia indicator segment and a dedicated fractional display segment, said display further including a numeric segment for displaying a numeric repetition value corresponding to a number of times said dedicated repeat key has been successively operated;
    said processor being responsive to said mode control signals to place said calculator in either a first mode of operation in which said values stored in said second memory portion are display values having distinct foot, inch, and fractional inch values, and a second mode of operation in which said values stored in said second memory portion are display values having decimal foot values; and wherein said processor is responsive to said selective operation of said keys and said plurality of stored instruction signals in both said first and second modes of operation to store in said first memory portion a binary floating point value corresponding to said display values, and said processor is responsive to selective operation of said dedicated repeat key to repeat a most recent operation corresponding to operation of one of said fourth plurality of keys and at least one of said first, second or third plurality of keys, and to calculate, and cause said numeric segment to display, said numeric repetition value.

* * * * *